United States Patent [19]

Black

[11] 3,897,712
[45] Aug. 5, 1975

[54] PLASTIC HEADED FASTENER ASSEMBLY

[75] Inventor: Daniel A. Black, Pleasant Hills, Pa.

[73] Assignee: Textron Inc., Providence, R.I.

[22] Filed: Jan. 9, 1974

[21] Appl. No.: 431,683

[52] U.S. Cl. ........................ 85/9 R; 85/53; 151/37
[51] Int. Cl.² ..................................... F16B 23/00
[58] Field of Search .......... 85/9 R, 1 JP, 53, 55, 54, 85/45; 151/37

[56] References Cited
UNITED STATES PATENTS

| | | | |
|---|---|---|---|
| 2,305,427 | 12/1942 | Joachim | 85/9 R |
| 2,761,347 | 9/1956 | McKee | 85/1 JP |
| 2,786,359 | 3/1957 | Karlan et al. | 85/1 JP |
| 3,134,290 | 5/1964 | Jentoft | 85/9 R |
| 3,557,654 | 1/1971 | Weidner | 85/9 R |
| 3,693,495 | 9/1972 | Wagner | 85/9 R |

FOREIGN PATENTS OR APPLICATIONS

| | | | |
|---|---|---|---|
| 916,162 | 1/1963 | United Kingdom | 85/53 |
| 991,961 | 5/1965 | United Kingdom | 85/9 R |
| 1,159,640 | 7/1969 | United Kingdom | 85/9 R |
| 608,864 | 9/1960 | Italy | 85/53 |

*Primary Examiner*—Ramon S. Britts
*Attorney, Agent, or Firm*—Webb, Burden, Robinson & Webb

[57] ABSTRACT

The fastener assembly includes a metal fastener and a plastic cap and can be installed in the assembled condition. The metal fastener includes a shank, a metal head and normally an integral metal washer therebetween. The head has a plurality of faces recessed by longitudinal arcuate grooves. The plastic cap has a plurality of side faces formed to matingly engage with the metal head. The side faces include a plurality of longitudinal slots which align with the ungrooved portion of the metal head so that in an assembled position the plastic cap is keyed into the grooves and the ungrooved portion forms exposed wrench engaging surfaces.

7 Claims, 8 Drawing Figures

PLASTIC HEADED FASTENER ASSEMBLY

FIELD OF THE INVENTION

My invention relates to fasteners and, more particularly, to a plastic cap and metal fastener assembly suitable for installation in the assembled condition.

DESCRIPTION OF THE PRIOR ART

Many plastic covers, caps and integral plastic fastener heads have been developed for utilization with metal siding, much of which is prefinished so that the exposed fastener head must color match the siding. The plastic head furnishes this aesthetic requirement and provides a certain amount of corrosion protection. The presently employed integral plastic fastener heads are sometimes bulky by necessity to gain resistance to strip torque. In general, the integral plastic headed fasteners require difficult and precise molding techniques to manufacture. In addition, the integral plastic heads frequently fail since the power fastener tools deface or loosen the plastic portion of the head. Plastic caps and covers are employed in which the fastener is installed without the cap or cover and it is thereafter positioned on the fastener head. Such an operation requires an additional labor step to place the caps or covers on the installed fasteners. In addition, inventories must include both fasteners and caps. The plastic caps and fasteners installed separately do have the advantage over the integral plastic headed fasteners that they are easier and less expensive to manufacture since the molding tolerances and techniques are substantially less. Such fasteners intended for building siding and roofing are often utilized with a sealing type washer assembled on the shank and the washer is subject to damage by steel burrs and sharp edges. Thumb screws and knobs are available with plastic caps which are installed by driving the cap on the fastener so as to shear a portion of the cap into tight frictional engagement with fastener. However, such fastener assemblies do not withstand high torques and, of course, a building erector would be unwilling to drive each plastic cap with a hammer prior to installation.

SUMMARY OF THE INVENTION

My invention solves the aforementioned problems by combining the single installation advantages of an integral plastic headed fastener with the advantages of manufacturing techniques associated with the cap and fastener assemblies utilized heretofore and installed in two steps. My invention also eliminates the bulkiness of the fastener head thereby reducing both metal and plastic material requirements. In addition, my fastener assembly has torquing capabilities commensurate with a metal fastener head. My fastener can also be used with an integral washer to eliminate washer damage as described heretofore.

My invention is a multi-piece fastener assembly including a metal fastener having a shank, a metal head and normally an integral washer therebetween. The metal head has a plurality of faces recessed in grooves to form keyways with the ungrooved portion of the faces forming the wrench engaging surfaces. The plastic cap is recessed to matingly engage with the metal head and includes a plurality of ribs which engage the keyways and a plurality of clear-through slots which align with and expose the wrench engaging surfaces of the metal. An integral plastic washer can be added to the fastener assembly and retained thereto by the plastic cap.

DESCRIPTION OF THE PREFERRED EMBODIMENTS

Figure 1:
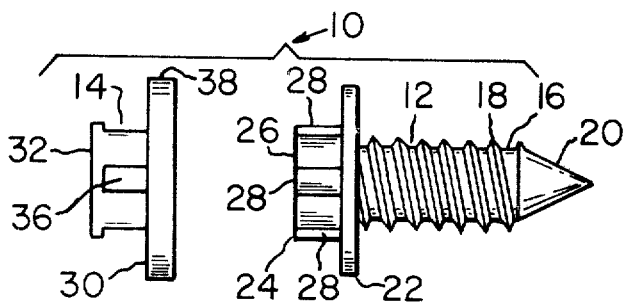
FIG. 1 is an exploded elevation of the fastener assembly.
Figure 4:
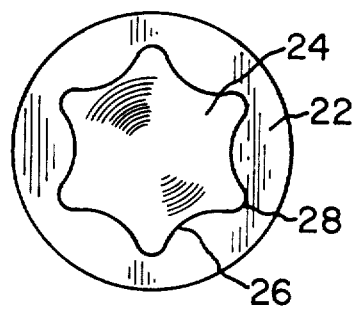
FIG. 4 is a plan view of the metal fastener.

My fastener assembly, generally designated 10, includes a fastener 12 made of metal and a plastic cap 14, FIG. 1. The fastener 12 includes a shank 16 having a plurality of threads 18 thereabout and terminating in a point 20. Adjacent the shank 16 is washer 22 and extending from washer 22 is head 24. The head 24 is constructed in principle to resemble a hex head but each side actually includes a longitudinal groove 26 extending to the washer 22 and wrench engaging surfaces 28 on either side of the groove 26. This gives the head 24 a fluted appearance since the grooves 26 normally cover more surface area than the wrench engaging surfaces 28 adjacent the groove 26, FIG. 4. As will be seen hereinafter, the grooves 26 act as keyways for the plastic cap. The surfaces 28 of adjacent faces actually merge into one another so that the surfaces 28 are formed at the apicies of the intersecting faces.

Figure 2:
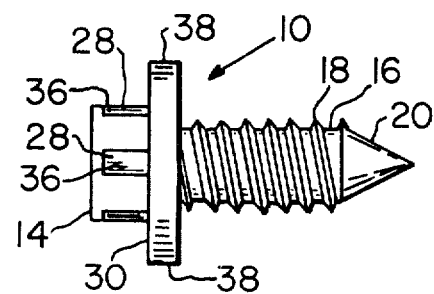
FIG. 2 is an elevation of the fastener assembly in assembled relationship.
Figure 3:
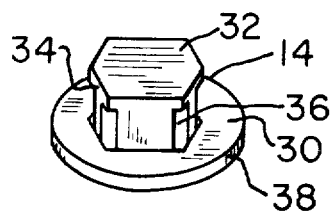
FIG. 3 is an isometric of the plastic cap.
Figure 3A:
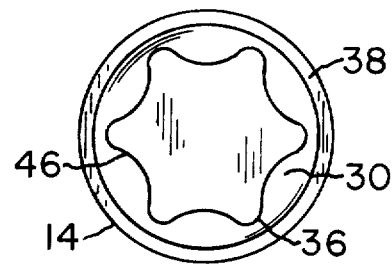
FIG. 3a is a bottom elevation of the plastic cap.

The plastic cap 14 includes a solid top surface 32, side faces 34 of which there are six, and an annular surface 30 having an annular flange 38 extending from the periphery thereof to accommodate the metal washer 22, FIG. 3. The cap 14 is constructed to matingly engage with the head 24 and the washer 22 of the metal fastener 12. Specifically, each side face 34 includes a longitudinally extending rib or flute 46 which extends radially inward and acts as the key for the grooves 26 formed in the metal head 24, FIG. 3a. Adjacent each flute 46 is a longitudinal slot 36 which extends clear through the plastic and which aligns with the exposed wrench engaging surfaces 28 of head 24, FIGS. 2 and 3. Therefore, in assembled condition, metal surfaces remain exposed for gripping by the driving tool.

Figure 5:
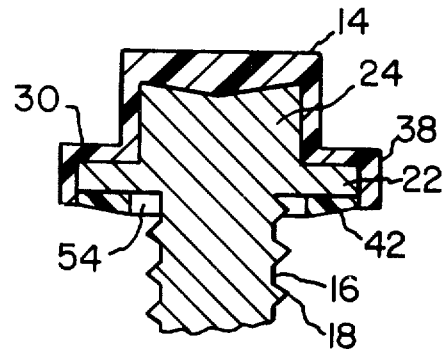
FIG. 5 is a section through the fastener assembly employing a plastic washer.
Figure 6:
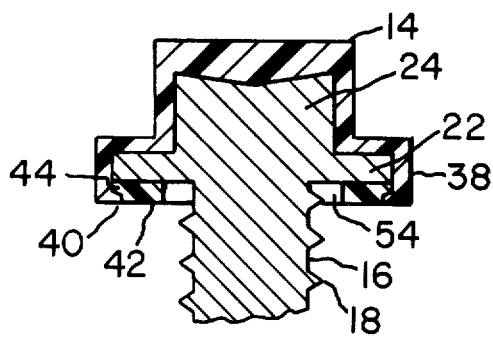
FIG. 6 is a section through a further embodiment of the assembly illustrated in FIG. 5.

My fastener assembly 10 can include a third component, namely plastic washer 42. Plastic washer 42 is push fit into engagement with annular flange 38 of the plastic cap 14 which in this embodiment is extended beyond the thickness of washer 22, FIG. 5. This push fit can be further secured by means of lip 40 which extends radially inward from annular flange 38 and which then accommodates mating recess 44 in plastic washer 42 after the plastic washer 42 is push fit into place, FIG. 6.

The integral washer 42 is retained by the plastic cap 14 instead of the fastener shank 16 and a space 54 is provided between the shank 16 and the washer 42. Space 42 accommodates the sharp edges and burrs of the workpiece and still permits extrusion of the plastic washer when subjected to high compression.

Figure 7:
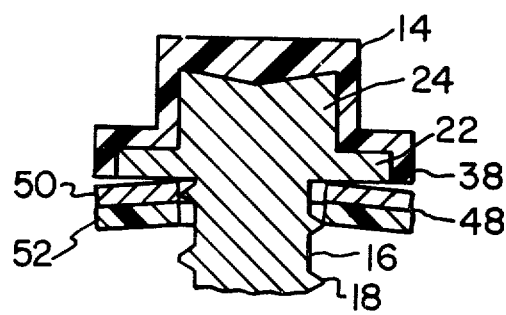
FIG. 7 is a section through my fastener assembly including a standard composite washer.

My fastener assembly 10 can also be employed with standard washers as illustrated in FIG. 7 where a standard composite washer 48 includes a dome-shaped metal backing 50 and a thermoplastic work engaging section 52 bonded to the metal backing 50. Such a washer is held in place through the frictional engagement of the washer with the threads 18 along shank 16.

The torquing capabilities of my fastener assembly have been tested in conjunction with metal fasteners and several presently employed integral plastic headed fasteners and plastic cap assemblies. The results, which represent the average of five independent tests, are set forth in Table 1.

TABLE 1

| | | Torque Required For Failure | |
|---|---|---|---|
| Part No. | Description | Strip Torque (in. lb.) | Nature of Failure |
| 1 | No. 14 × 3/4" C. steel cad. plated screw, 3/8" hex head | 212 | Threads stripped |
| 2 | No. 14 × 3/4" C. steel cad. plated, nylon plastic 7/16" hex head | 83 | Plastic corners failed |
| 3 | No. 12 × 3/4" C. steel cad. plated, nylon plastic 3/8" hex head | 63 | Plastic corners failed |
| 4 | No. 14 × 3/4" C. steel cad. plated, 3/8" hex head, 7/16" plastic cap | 15 | Plastic corners of cap failed |
| 5 | No. 14 × 1" C. steel cad. plated, 5/16" hex head, 3/8" plastic cap | 5 | Plastic corners of cap failed |
| 6 | No. 14 × 3/4" C. steel cad. plated, 3/8" head of invention | 200 | Threads stripped |

From Table 1 it can be seen that the fastener assembly of the invention, Part No. 6, had a strip torque capability about equivalent to the standard screw, Part No. 1, with a metal head and both fasteners failed in torque by stripping the threads along the shank. The integral plastic headed fasteners, Part Nos. 3 and 4, achieved failure at applied torques up to 41.5 percent of the stripping torque of the subject invention and failure occurred when the plastic corners of the integral plastic head failed. The standard snap-on plastic caps were installed in the assembled condition, Part Nos. 4 and 5, and failure occurred at applied torques of 15 inch pounds or less as the corners of the plastic cap failed. It can, therefore, be seen that fastener assemblies of the subject invention can attain torquing capabilities of a standard metal fastener while providing the advantages of a plastic headed fastener without the complex molding and manufacturing techniques currently associated therewith.

I claim:

1. A two piece fastener assembly suitable for installation in the assembled condition comprising:
   A. a metal fastener including a shank extending from a metal head, said head having a plurality of faces, each face including a longitudinal groove and a remaining ungrooved portion; and
   B. a plastic cap having a top surface and a plurality of side faces matingly engaging the metal head and including a plurality of longitudinal slots extending entirely through the side faces aligned with the ungrooved portions, said ungrooved protions projecting through the slots to define exposed metal wrench engaging surfaces, and a plurality of inwardly extending flutes on the plastic cap keyed into the grooves.

2. A multiple piece fastener assembly suitable for installation in the assembled condition comprising:
   A. a metal fastener including an integral head, washer and a threaded shank, said head having a plurality of joined faces, each face having a longitudinal groove intermediate the ends thereof and extending to the washer to form a keyway portion and a wrench engaging portion on either side of the keyway portion; and
   B. a plastic cap including a head having a solid top and side face terminating in an annular surface having a flange extending normal therefrom, said head including a recess matingly engaging the fastener head and forming a plurality of longitudinal keys extending radially inwardly into the respective grooves and longitudinal slots extending entirely through the flange the wrench engaging portions projecting through the slots to define exposed metal wrenching portions, the annular surface and flange covering the washer.

3. The assembly of claim 2 wherein the plastic flange is dimensioned to extend beyond the metal washer and a plastic washer is positioned on the shank adjacent the metal washer in push fit engagement with the extended flange.

4. The assembly of claim 2 wherein the metal head includes six faces in hex head configuration, at least 50 percent of each face defined by the groove and each slot exposing apicies formed by joined metal faces.

5. The assembly of claim 2 including a washer frictionally engaging the shank and positioned adjacent the fastener washer.

6. The assembly of claim 3 wherein an annular lip extends radially inward from the plastic flange containing the plastic washer in assembled relationship.

7. The assembly of claim 6, said plastic washer recessed at its periphery to lock with the annular lip.

* * * * *